United States Patent
Nakayama (10) Patent No.: US 9,143,001 B2
(45) Date of Patent: Sep. 22, 2015

(54) WIRELESS CHARGING SYSTEM

(71) Applicant: Hitachi Power Solutions Co., Ltd., Ibaraki (JP)

(72) Inventor: Takeshi Nakayama, Hitachinaka (JP)

(73) Assignee: HITACHI POWER SOLUTIONS, CO., LTD., Ibaraki (JP)

( * ) Notice: Subject to any disclaimer, the term of this patent is extended or adjusted under 35 U.S.C. 154(b) by 192 days.

(21) Appl. No.: 13/946,347

(22) Filed: Jul. 19, 2013

(65) Prior Publication Data

US 2014/0035520 A1    Feb. 6, 2014

(30) Foreign Application Priority Data

Jul. 19, 2012 (JP) .................. 2012-160716

(51) Int. Cl.
*H02J 7/00* (2006.01)
*H02J 7/02* (2006.01)
*H02J 17/00* (2006.01)

(52) U.S. Cl.
CPC ...... *H02J 7/025* (2013.01); *H02J 17/00* (2013.01)

(58) Field of Classification Search
CPC .................................. H02J 5/005; H02J 7/025
USPC .................. 320/106–109, 114–115, 132, 139
See application file for complete search history.

(56) References Cited

U.S. PATENT DOCUMENTS 5,617,003 A    4/1997  Odachi et al.
2013/0271066 A1*  10/2013  Signorelli et al. ............ 320/107

FOREIGN PATENT DOCUMENTS

| JP | 8-265992 | 10/1996 |
| JP | 2008-087733 | 4/2008 |
| JP | 2011-151351 | 8/2011 |

* cited by examiner

*Primary Examiner* — Paul Dinh
(74) *Attorney, Agent, or Firm* — Baker Botts L.L.P.

(57) ABSTRACT

Wireless charging system suppressing reduction of an electric power feeding efficiency due to imperfect alignment caused between a transmitter and a receiver unit. Included are a first 18 and a second coil portion 15 fixed to a first 14 and a second magnetic member 21, respectively, and close to each other to be disposed so as to face each other, thereby feeding electric power from one coil portion to the other coil portion. Further included is a convex portion 24 mounted to the first magnetic member to protrude toward the second magnetic member when the first and the second coil portion are coaxially disposed; a cover 27 covering the second coil portion; and a concave portion 29 provided in the cover so as to face the convex portion when the first and the second coil portion are coaxially disposed. The convex portion contains as a material thereof a magnetic material.

8 Claims, 8 Drawing Sheets

WIRELESS CHARGING SYSTEM

BACKGROUND OF THE INVENTION

1. Field of the Invention

The present invention relates to a wireless charging system which supplies electric power by utilizing a mutual interaction of electromagnetic induction.

2. Description of the Related Art

A charging system is configured to feed electric power from an electric power system to a secondary battery mounted to an electric moving vehicle or the like, thereby storing power in the secondary battery. One example of such charging systems is a wireless charging system in which the electric power system is not connected to the secondary battery in a wired manner. With regard to a technique relating to the wireless charging system, there is known one including a wiring (primary coil) on a transmitter unit side and a wiring (secondary coil) on a receiver unit side which have a structure in which an electric wire is wound in a flattened manner, and flat plate-like magnetic cores around which the two wirings are wound, respectively. This technique, for example, is described in JP-4356844-B. A so-called wired charging system requires an operation with which a driver of the electric moving vehicle gets off the vehicle on a case-by-case basis and carries out connection to a plug for electric power feeding installed in a charging station or the like, and so forth. However, if the wireless charging system is used, then the electric power can be supplied from the transmitter unit including the electric power system to the receiver unit including the secondary battery by utilizing a mutual interaction of electromagnetic induction. As a result, an operation accompanied by the getting on and off of the driver becomes unnecessary and so his or her convenience is enhanced. A problem with this kind of technique, however, is that the charging efficiency is reduced because the wireless style is used between the transmitter unit and the receiver unit.

To increase the charging efficiency of the wireless charging system, a shaft center of the transmitter unit (a shaft center of the primary coil) and a shaft center of the receiver unit (a shaft center of the secondary coil) are preferably aligned with each other as much as possible. The reason for this is because if the shaft centers of the transmitter unit and the receiver unit are different from each other (imperfect alignment), then, a part of magnetic field lines generated by the transmitter unit does not interlink the receiver unit, and thus electric power feeding efficiency is reduced in some cases. With regard to a technique which was made in the light of this respect, there is known one with which the transmitter unit and the receiver unit are aligned with each other based on the electric power change either in the primary coil or in the secondary coil due to the induced electromagnetic force, whereby the shaft centers of the transmitter unit and the receiver unit are tried to make automatically close to each other without requiring a special operating technique. This technique, for example, is described in JP-H8-265992-A.

In addition, the following technique is also known. A primary core having a protrusion portion made of a soft magnetic material and passing through the primary coil is provided in the transmitter unit, and a secondary core having a protrusion portion made of a soft magnetic material and passing through the secondary coil is provided in the receiver unit. Therefore, even when the primary core and the secondary core come in contact with each other in a state of being slightly misaligned with each other, the stable electric power supply is tried to be carried out while the shock when the primary core and the secondary core come in contact with each other is relaxed. This technique, for example, is described in JP-2011-151351-A.

SUMMARY OF THE INVENTION

However, the technique described in JP-H08-265992-A involves the following problem. A unit or device for moving the transmitter unit (primary coil) in three-axis directions (X, Y, and Z directions) is required, and it takes time from stopping to start of the electric power feeding in order to carry out the alignment in order with respect to the directions of the three axes, and so forth. In addition, with the technique described in JP-2011-151351-A, when the protrusion portions are made away from each other (when the primary core and the secondary core do not come in contact with each other), the stable electric power supply cannot be carried out. In addition, the provision of the protrusion portion on the surface of the transmitter unit embedded in the ground may result in the problem that not only circumferential ferromagnetic dirt (for example, iron pieces or nails) are sucked, but also such a protrusion lies in the way for the traffic of auto mobiles, human beings, or the like.

The present invention has been made in order to solve the problems described above, and it is therefore an object of the present invention to provide a wireless charging system which is capable of suppressing reduction of an electric power feeding efficiency due to imperfect alignment even when the imperfect alignment is caused between a transmitter unit and a receiver unit.

In order to attain the object described above, according to an embodiment of the present invention, there is provided a wireless charging system including a first coil portion fixed to a first magnetic member, and a second coil portion fixed to a second magnetic member, the first coil portion and the second coil portion being made close to each other to be disposed so as to face each other, thereby feeding electric power from one coil portion to the other coil portion. The wireless charging system further includes: a convex portion which is mounted to the first magnetic member so as to protrude toward the second magnetic member when the first coil portion and the second coil portion are coaxially disposed; a cover for covering the second coil portion; and a concave portion which is provided in the cover so as to face the convex portion when the first coil portion and the second coil portion are coaxially disposed. The convex portion contains therein as a material thereof a magnetic material.

As set forth hereinabove, according to the present invention, a magnetic path through which the transmitter unit and the receiver unit are connected to each other can be formed by the convex portion even when the imperfect alignment is caused between the transmitter unit and the receiver unit. Thus, the reduction of the electric power feeding efficiency can be suppressed.

DESCRIPTION OF THE PREFERRED EMBODIMENTS

Figure 1:
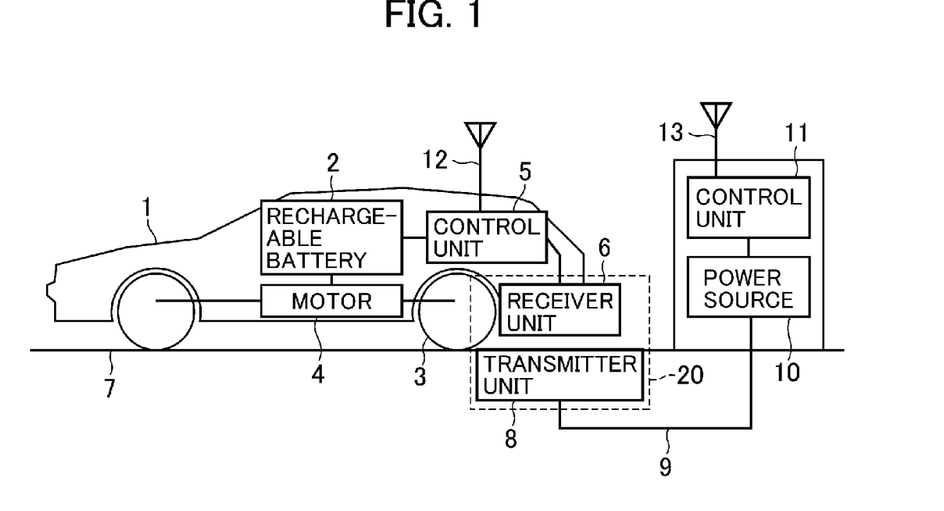
FIG. 1 is a diagram showing an entire configuration of a wireless charging system according to a first embodiment of the present invention.

Hereinafter, embodiments of the present invention will be described in detail with reference to the accompanying drawings. FIG. 1 is a diagram showing an entire configuration of a wireless charging system according to a first embodiment of the present invention. The wireless charging system shown in the figure includes a receiver unit (electric power receiving portion) 6 connected to a secondary battery 2, and a transmitter unit (electric power feeding portion) 8 for supplying electric power to the receiver unit 6 in a wireless manner by utilizing a mutual interaction of the electromagnetic induction. Thus, in the wireless charging system shown in the figure, a coil portion (described later) of the receiver unit 6, and a coil portion 15 (described later) of the transmitter unit 8 are made close to each other to be disposed so as to face each other, thereby feeding the electric power from the coil portion 15 to the coil portion 18. In this case, although a description will now be given by exemplifying an electric moving vehicle 1 (for example, an electric vehicle shown in FIG. 1, an electric train/monorail which travels along a rail, and the like) which is driven by the secondary battery 2 as a movable body which is loaded with the secondary battery 2 and the receiver unit 6, the wireless charging system according to the present invention can be applied to the movable body as long as a movable body includes a chargeable battery.

The receiver unit 6 includes a coil portion (secondary coil) 18 and a magnetic material portion 14 both of which will be described later, and is connected to the secondary battery 2 through a reception side control unit 5. The electric power which has been supplied from the transmitter unit 8 is stored in the secondary battery 2. The electric power stored in the secondary battery 2 is supplied to a motor 4 which is mechanically coupled to a wheel 3 to drive the motor 4. As a result, the electric moving vehicle 1 travels.

A control unit 5 serves to mainly execute processing about charging control for the secondary battery 2. An antenna 12 is connected to the control unit 5. The antenna 12 gives and receives various information such as start and end of the charging for the secondary battery 2, and states (such as temperatures and relative positions of the coil portions 18 and 15) of the receiver unit 6 and the transmitter unit 8 between an antenna 13 which will be described later of the transmitter unit 8, and the antenna 12.

The transmitter unit 8 includes a coil portion (primary coil) 15 and a magnetic material portion 21 both of which will be described later, and is connected to a power source 10 through a cable (electric power line) 9. The power source 10 is connected to an electric power feeding control unit 11. A control unit 11 serves to mainly execute processing about the electric power feeding control for the receiver unit 6. An antenna 13 is connected to the control unit 11. When the secondary battery 2 is intended to be charged with the electricity in the case shown in FIG. 1, the electric moving vehicle 1 is made to stand still in such a way that the receiver unit 6 faces the transmitter unit 8 embedded in a ground 7.

Figure 2:
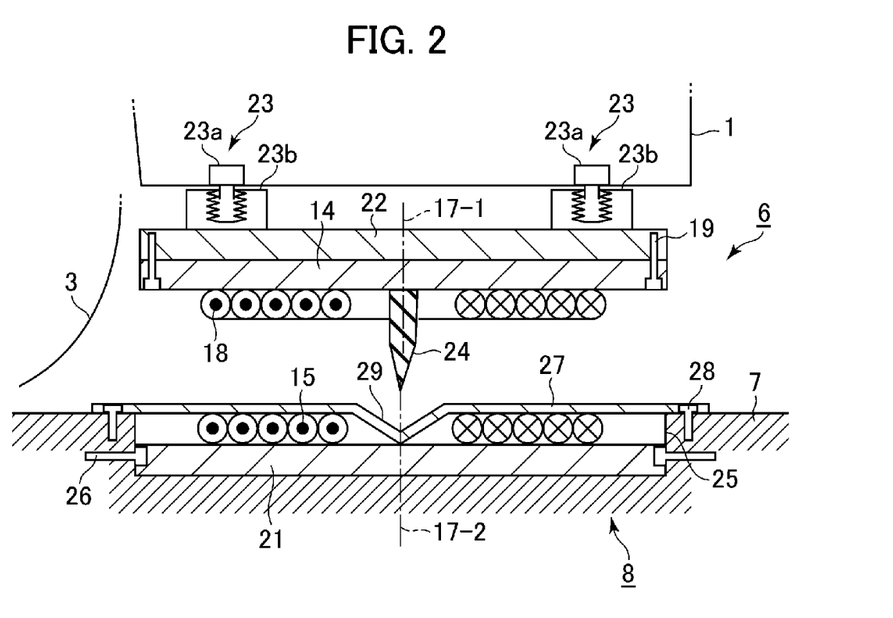
FIG. 2 is an enlarged view of a circumstance of a receiver unit and a transmitter unit in the wireless charging system according to the first embodiment of the present invention (non-charging state)
Figure 3:
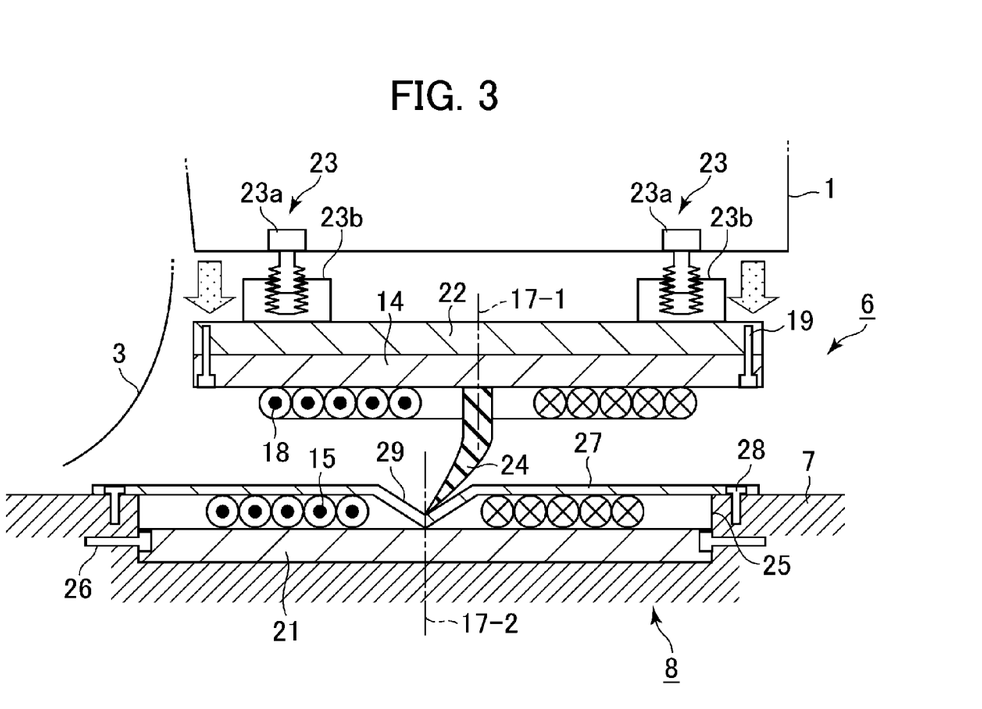
FIG. 3 is an enlarged view of the circumstance of the receiver unit and the transmitter unit in the wireless charging system according to the first embodiment of the present invention (during charging)

Next, a description will now be given with respect to a detailed structure of the circumference (a region 20 indicated by a broken line in FIG. 1) of the receiver unit 6 and the transmitter unit 8 in the wireless electric charging system 1 according to the first embodiment of the present invention. FIGS. 2 and 3 are respectively enlarged views of the circumference of the receiver unit 6 and the transmitter unit 8 in the wireless charging system 1 according to the first embodiment of the present invention. FIG. 2 shows a non-charging state, and FIG. 3 shows a state during the charging. It is noted that in FIGS. 2 and 3, the same portions as those in FIG. 1 are designated by the same reference numerals or symbols, respectively, and a description thereof may be suitably omitted in some cases (this also applies to each of figures following FIGS. 2 and 3).

In these figures, the receiver unit 6 includes a magnetic member 14 made of a magnetic material, and an approximately flat-shaped coil portion (secondary coil) 18 which is formed by wiring an electric wire around a predetermined axis (a central axis 17-1 in the case shown in FIGS. 2 and 3). Also, the receiver unit 6 includes a convex portion 24 mounted to the magnetic member 14, and a lifting mechanism 23 for making the coil portion 18 close to the transmitter unit 8.

The coil portion 18 is fixed to a surface of the magnetic member 14 by, for example, an adhesive agent such as a resin. In addition, the coil portion 18 is approximately, horizontally adhered to a lower surface (a surface on the ground 7 side) of the magnetic member 14 so as to be able to face the coil portion 15 on the side of the transmitter unit 8 which is fixed approximately, horizontally as will be described later in a state in which a central axis 17-1 of the coil portion 18, and a central axis 17-2 of the coil portion 15 are aligned with each other. In addition, the coil portion 18 in the first embodiment is provided so as to be positioned in the outside (outer surface side) of the electric moving vehicle 1 relative to the magnetic member 14 and so as to be able to face the coil portion 15 installed outside the electric moving vehicle 1 on the same axis. It is noted that with regard to the material of the coil portion 18, a litz wire or the like is preferable because it reduces an eddy-current loss due to a skin effect.

The magnetic member 14 shown in the figure is formed in a plate-like shape, and is approximately horizontally fixed to a supporting base 22 formed in a plate-like shape through a fixing bracket 19. It is noted that with regard to the material of the magnetic member 14, a material such as ferrite is preferable because it reduces the eddy current. The supporting base 22 is approximately horizontally mounted to a bottom surface of the electric moving vehicle 1 through the lifting mechanism 23. It is noted that with regard to the material of the supporting base 22, a non-magnetic material such as aluminum is preferable.

The lifting mechanism 23 ascends/descends the receiver unit 6 in accordance with a signal from the reception side control unit 5. The lifting mechanism 23 shown in FIGS. 2 and 3 includes two motors 23a having male screws provided in output axes thereof, and two supporting portions 23b in which female screw portions which are screwed into the male screw portions of the two motors 23a are provided, respectively. When the motors 23a are driven, the supporting portion 23b is ascended/descended in correspondence to a rotational direction of the motors 23a, thereby ascending/descending the receiver unit 6. When the coil portion 18 is installed so as to be able to be ascended/descended approximately in the vertical direction by the lifting mechanism 23, during the traveling of the electric moving vehicle 1, the coil portion 18 or the like can be prevented from colliding with an obstacle, and during the charging, the reception side coil portion 18 can be made close to the transmission side coil portion 15.

The convex portion (protrusion portion) 24 is mounted to the magnetic member 14, and protrudes toward the magnetic member 21 of the transmitter unit 8 when the two coil portions 15 and 18 are coaxially disposed in the manner as shown in FIG. 2. The convex portion 24 shown in FIGS. 2 and 3 is mounted to the magnetic member 14 in such a way that an upper end of the convex portion 24 is located at the center of the coil portion 18. Also, the convex portion 24 protrudes from a hollow portion in the coil portion 18. For this reason, in a state in which a lower end of the convex portion 24 does not contact any other object (for example, in a state in which the supporting base 22 is held in the highest position by the lifting mechanism 23), the shaft center of the convex portion 24 is approximately aligned with the central axis 17-1 of the coil portion 18. In addition, the convex portion 24 is larger in a size thereof in a direction (in a length direction) along the central axis 17-1 of the coil portion 18 than in a size of the coil portion 18 in a direction (in a width direction) along a radial direction thereof. As a result, when the convex portion 24 comes in contact with any other object (for example, a cover 27), it is bent as shown in FIG. 3. The size of the convex portion 24 in the length direction thereof (the length in the axial direction) is ensured to be larger than the length along which the convex portion 24 can come in contact with the concave portion 29 when the reception side coil portion 18 and the transmission side coil portion 15 are made close to each other in the phase of the charging. The convex portion 24 contains therein as a material thereof a magnetic material from a viewpoint of formation of the magnetic path. Moreover, when the convex portion 24 gets away from other object, the convex portion 24 preferably returns in a shape thereof back to the original shape even after the convex portion 24 has come in contact with other object to be deformed in the manner as described above. Therefore, the convex portion 24 is preferably made of a mixture of a material having a small Young's modulus, and a magnetic material. For example, a magnetic rubber is preferable which contains therein a resin and a magnetic material in a mixing manner. The convex portion 24 may be a spring made of a metal.

Figure 4:
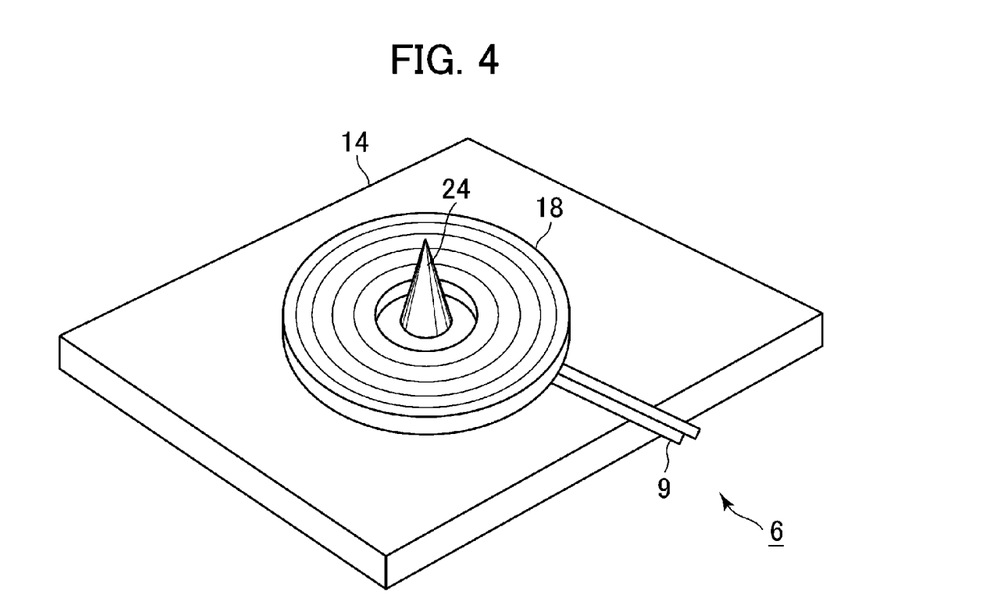
FIG. 4 is a perspective view showing a structure of a coil portion, a magnetic member, and a convex portion of the receiver unit in the wireless charging system according to the first embodiment of the present invention when viewed from the transmitter unit.

FIG. 4 is a perspective view of the coil portion 18, the magnetic member 14, and the convex portion 24 of the receiver unit 6 in the wireless charging system 1 according to the first embodiment of the present invention when viewed from the transmitter unit 8 side. As shown in FIG. 4, the convex portion 24 is disposed at the center of the coil portion 18, and the convex portion 24 gradually decreases in radius as it further gets away from the magnetic member 14. That is to say, when the two coil portions 15 and 18 are coaxially disposed, the convex portion 24 gradually decreases toward the transmission side coil portion 15 (the transmitter unit 8) while it extends along the axial direction 17-1 of the reception side coil portion 18. If the end portion on the transmitter unit 8 side in the convex portion 24 is made slender, then, even when the misalignment between the central axes 17-1 and 17-2 of the two coil portions 18 and 15 is large, the convex portion 24 is easy to guide into the concave portion 29.

Figure 5:
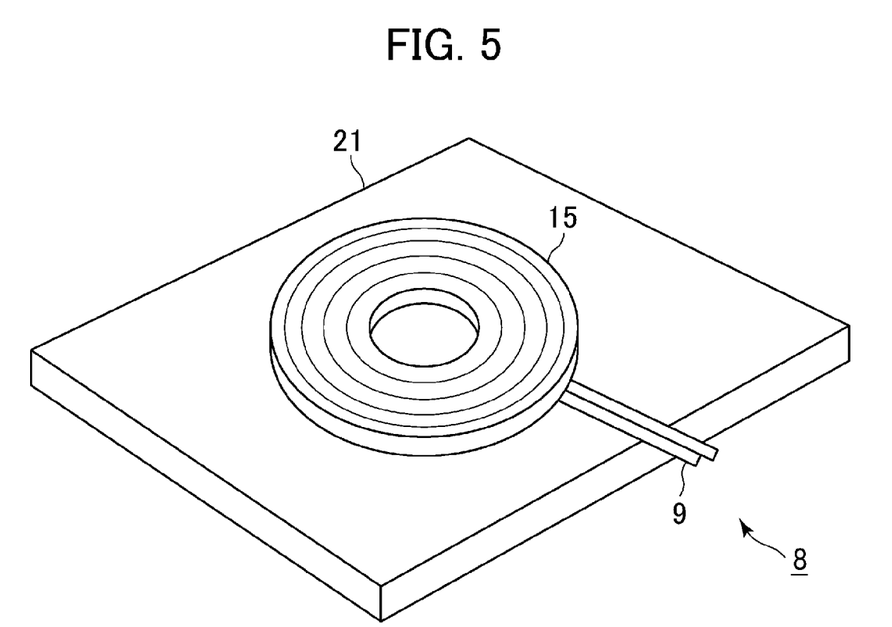
FIG. 5 is a perspective view showing a structure of a coil portion and a magnetic member of the transmitter unit in the wireless charging system according to the first embodiment of the present invention when viewed from the receiver unit side.

The transmitter unit 8 is stored in a storage container 25 which is embedded in a hole dug in the ground 7. Also, the transmitter unit 8 includes a magnetic member 21 made of a magnetic material, an approximately flat coil portion (primary coil) 15 which is formed by winding an electric wire around a predetermined axis (the central axis 17-2 in the cases of FIGS. 2 and 3), the cover 27 for covering the coil portion 15, and a concave portion 29 provided in the cover 27. FIG. 5 is a perspective view of the coil portion 15 and the magnetic member 21 of the transmitter unit 8 in the first embodiment of the present invention when viewed from the receiver unit 6 side.

The coil portion 15 is fixed to a surface of the magnetic member 21 by an adhesive agent such as a resin, or the like. In addition, the coil portion 15 is approximately horizontally adhered to an upper surface of the magnetic member 21 so as to be able to face the coil portion 18 on the receiver unit 6 side in a state in which the central axis 17-1 of the coil portion 18, and the central axis 17-2 of the coil portion 15 are aligned with each other. It is noted that with regard to the material of the coil portion 15, a litz wire or the like is preferable because it reduces the eddy-current loss due to the skin effect.

The magnetic member 21 is formed in a plate-like shape, and is approximately horizontally fixed within a storage container 25 through a fixing bracket 26. With regard to the material of the magnetic member 14, a material such as ferrite is preferable because it reduces the eddy current.

An opening portion is provided in an upper portion of the storage container 25 and is covered with the cover 27. The cover 27 is fixed to the ground 7 so as to be unable to be relatively moved with respect to the coil portion 15. A storage bracket 25 supports together with the cover 27 a weight of an object (such as the human being or the automobile) which comes and goes on the ground 7, and protects both of the coil portion 15 and the magnetic member 21 from the object. With regard to the material of the cover 27, for example, a high-resistance non-magnetic member such as a fiber-reinforced plastic (FRP) or an austenitic stainless steel.

The concave portion 29 is depressed in a mortar-like shape toward the magnetic member 21. Also, the concave portion 29 is provided in the cover 27 so as to face the convex portion 24 when as shown in FIG. 2, the two coil portions 15 and 18 are coaxially disposed. That is to say, the center of the concave portion 29 is approximately aligned with the central axis 17-2 of the coil portion 15. A size (a diameter of an opening end of the concave portion 29) of the end portion on the receiver unit 6 side in the concave portion 29 is formed to be larger than that (a diameter of the lower end) of the end portion on the transmitter unit 8 side in the convex portion 24, which allows the lower end (tip) of the convex portion 24 to be introduced into the concave portion 29. In addition, the concave portion 29 in the first embodiment gradually increases in diameter as it further gets away from the magnetic member 21. That is to say, when the two coil portions 15 and 18 are coaxially disposed, the concave portion 29 gradually increases in diameter toward the reception side coil portion 18 (the receiver unit 6) while it extends along the axial direction 17-2 of the transmission side coil portion 15. When the concave portion 29 is formed in such a manner, the tip of the convex portion 24 can be guided to a desired position as the receiver unit 6 and the transmitter unit 8 are made close to each other. It is noted that the concave portion 29 shown in FIGS. 2 and 3 is the approximately conical depression, and such cone and the coil portion 15 have the central axis 17-2 in common. As a result, when the receiver unit 6 is made close to the transmitter unit 8, the tip of the convex portion 24 is guided to the center of the coil portion 15.

Next, referring back to FIG. 1, a description will be given with respect to a procedure of a charging method for the secondary battery 2 by using the wireless charging system, according to the first embodiment of the present invention, which is configured in the manner as described above. A driver of the electric moving vehicle 1 moves the electric moving vehicle 1 in such a way that a relative distance between the transmitter unit 8 and the receiver unit 6 (a relative distance between the central axis 17-1 and the central axis 17-2) which is detected through the antennas 12 and 13 falls within a predetermined range, and carries out the positioning of the electric moving vehicle 1. As a result, the paired coil portions 15 and 18 in the transmitter unit 8 and the receiver unit 6 are disposed so as to face each other.

Next, a signal is sent to the lifting mechanism 23. This signal is used to descend the receiver unit 6 by a predetermined distance in accordance with, for example, an instruction issued by the driver of the electric moving vehicle 1, an instruction from the software previously set based on information on the relative distance between the transmitter unit 8 and the receiver unit 6, or an instruction directly inputted from the operator such as the driver to the transmission side control unit 11. As a result, the motor 23a descends the receiver unit 6 to the transmitter unit 8 side. In this case, even in the case where the central axes 17-2 and 17-1 of the two coil portions 15 and 18 are slightly misaligned with each other, if the tip (lower end) of the convex portion 24 disposed in the receiver unit 6 is guided into the concave portion 29 of the transmitter unit 8, then, the magnetic path is formed through which the center of the reception side coil portion 18 is connected to the center of the transmission side coil portion 15. Referring to FIG. 3, the tip of the convex portion 24 is moved along an inclined surface of the convex portion 29 of the transmitter unit 8, whereby the convex portion 24 is deformed to form the magnetic path through which the center of the reception side coil portion 18 is connected to the center of the transmission side coil portion 15.

When the descending of the receiver unit 6 by the lifting mechanism 23 have been completed, an energization start instruction is issued from the transmission side control unit 11 to the power source 10. As a result, an A.C. current having a predetermined frequency (for example, 10 kHz) is caused to flow through the coil portion 15 of the transmitter unit 8. Also, an induced current is caused to flow through the reception side coil portion 18 by an electromagnetic induction operation caused by an A.C. magnetic field formed by the transmission side coil portion 15 interlinking the reception side coil portion 18, thereby charging the secondary battery 2 with the electricity via a rectifier (not shown). Next, a description will be given with respect to magnetic field lines in the phase of the charging in the wireless charging system according to the first embodiment of the present invention with reference to FIGS. 6 to 8.

Figure 6:
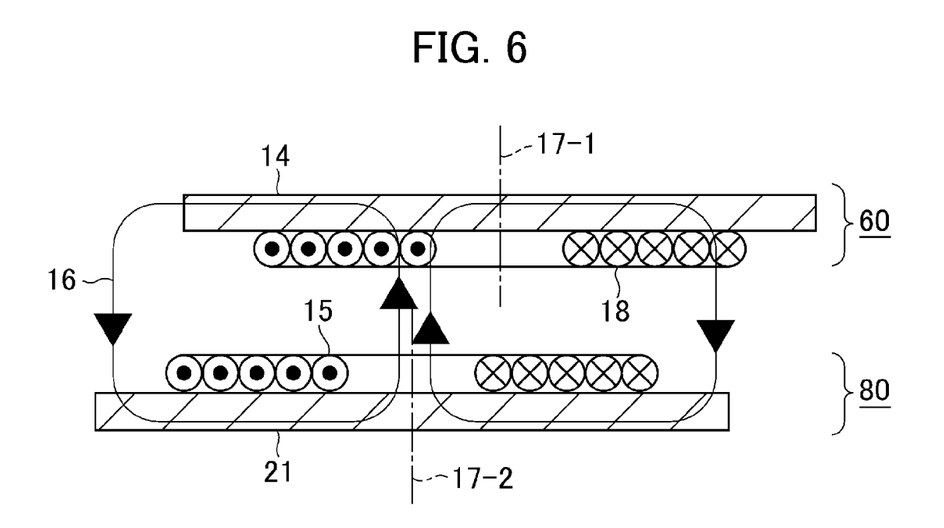
FIG. 6 is a sectional view showing magnetic field lines in a phase of charging when imperfect alignment is caused between a transmitter unit and a receiver unit in a conventional wireless charging system.
Figure 7:
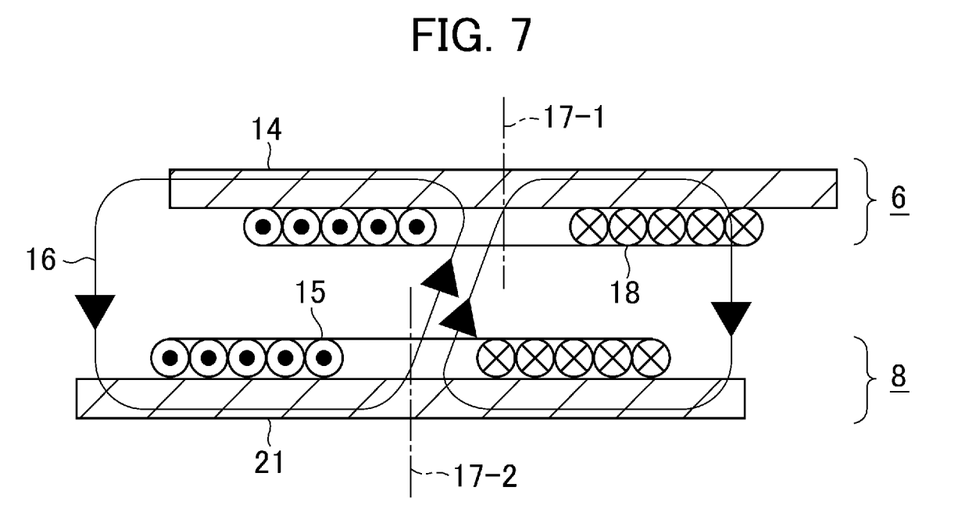
FIG. 7 is a sectional view showing magnetic field lines in the phase of the charging when the imperfect alignment is caused between the transmitter unit and the receiver unit in the wireless charging system according to the first embodiment of the present invention.
Figure 8:
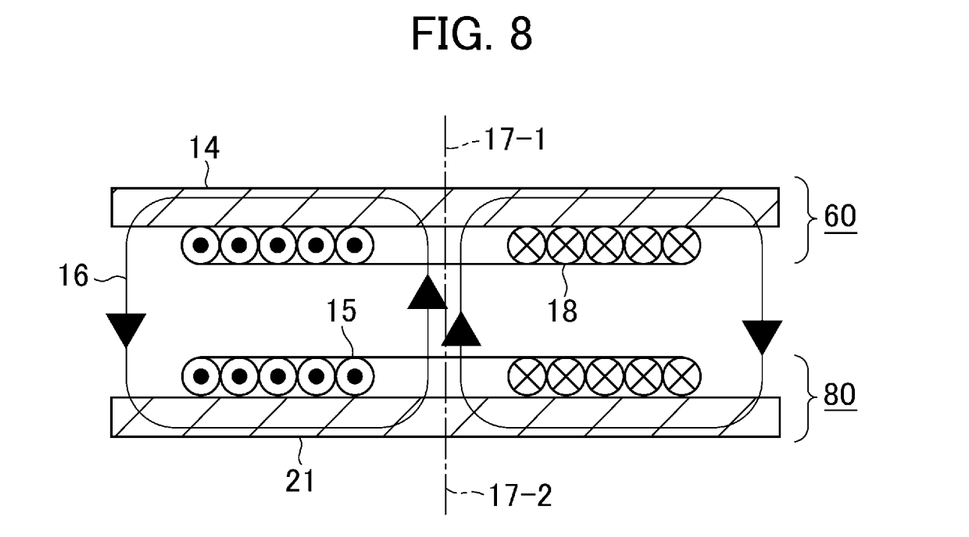
FIG. 8 is a sectional view showing magnetic field lines in the phase of the charging when the central axes of the transmitter unit and the receiver unit are aligned with each other in the conventional wireless charging system.

FIG. 6 is a sectional view showing magnetic field lines in the phase of the charging when the imperfect alignment is caused between a transmitter unit 80 and a receiver unit 60 in a conventional wireless charging system. FIG. 7 is a sectional view showing magnetic field lines in the phase of the charging when the imperfect alignment is caused between the transmitter unit 8 and the receiver unit 6 in a wireless charging system according to the first embodiment of the present invention. Also, FIG. 8 is a sectional view showing magnetic field lines in the phase of the charging when the central axes of the transmitter unit 80 and the receiver unit 60 are aligned with each other in the conventional wireless charging system.

As shown in FIG. 6, in the conventional wireless charging system including the receiver unit 60 not having the convex portion 24, and the transmitter unit 80 not having the concave portion 29, since a part of the magnetic field lines generated by the transmitter unit 80 does not come to interlink the receiver unit 60, the electric power feeding efficiency between the transmitter unit 80 and the receiver unit 60 is reduced. On the other hand, in the first embodiment of the present invention, even when the imperfect alignment is caused between the transmitter unit 8 and the receiver unit 6, as shown in FIG. 7, the magnetic fluxes pass through the concave portion 24 which contains therein the magnetic material and which has the low magnetic resistance. For this reason, the state can be made close to the state as shown in FIG. 8 in which the central axes of the transmitter unit 80 and the receiver unit 60 are aligned with each other. As a result, it is possible to increase a coupling coefficient between the transmitter unit 8 and the receiver unit 6. Therefore, according to the first embodiment of the present invention, even when the imperfect alignment is caused between the transmitter unit 8 and the receiver unit 6, the magnetic path is formed through which both of the transmitter unit 8 and the receiver unit 6 are coupled to each other, thereby suppressing the reduction of the electric power efficiency.

When the secondary battery 2 has been charged with a predetermined amount of electricity, the control unit 5 on the receiver unit 6 side either detects this state, or receives an end instruction issued by the operator. As a result, a command about energization end is transmitted to the control unit 11 of the transmitter unit 8 through both of the antennas 12 and 13. Then, the control unit 11 transmits a signal about the energization end to the power source 10 (otherwise, the energization by the power source 10 may be ended in accordance with a direct end instruction to the control unit 11 by the operator).

Also, the reception side control unit 5 sends a signal to the lifting mechanism 23 to ascend the receiver unit 6 up to a predetermined position, thereby completing a series of charging operations.

As a result, it is possible to realize the highly efficient electric power feeding operation and to shorten the charging time while the convenience of the wireless charging which is free from the getting on and off of the driver, and the cable detachable operation is enjoyed. In addition, the convex portion 24 (magnetic path) is disposed on the magnetic circuit, which allows most of the magnetic field lines generated by both of the transmitter unit 8 and the receiver unit 6 to pass through the ferromagnetic material. Thus the leaked magnetic field to the circumferences can be reduced. In addition, the high-electric power efficiency can also be devoted to the reduction of the cost. That is to say, since the charging time equal to conventional one can be attained with the electric transmission current less than conventional one, the thin conductor which is more inexpensive than conventional one can be applied as the conductor of the coil portions 15 and 18. In addition, the inexpensive power source whose output electric power is lower than conventional one can be applied. Moreover, since the distance between the transmitter unit and the receiver unit can be widely ensured in a phase other than the phase of the charging, it is possible to reduce the chances of the transmitter unit 8 and the receiver unit 6 colliding with the obstacle.

It is noted that although in the foregoing, from a viewpoint of giving priority to the easiness of guiding the convex portion 24 to the concave portion 29, the description has been given with respect to the case where the convex portion 24 decreases in diameter as it further gets away from the magnetic member 14, the diameter of the convex portion 24 may be constant. In addition, although from a viewpoint of making the central axes 17-2 and 17-1 of the two coil portions 15 and 18 close to each other, the description has been given with respect to the case where the convex portion 29 increases in diameter as it further gets away from the magnetic member 21, the diameter of the convex portion 29 may be constant. Moreover, although the shape of the convex portion 24, as shown in FIGS. 2 to 4, is preferably the conical shape, the shape of the convex portion 24 may have any other suitable structure such as a column or a prism. Also, the shape of the convex portion 24 may have the structure which will be described below.

Figure 9:
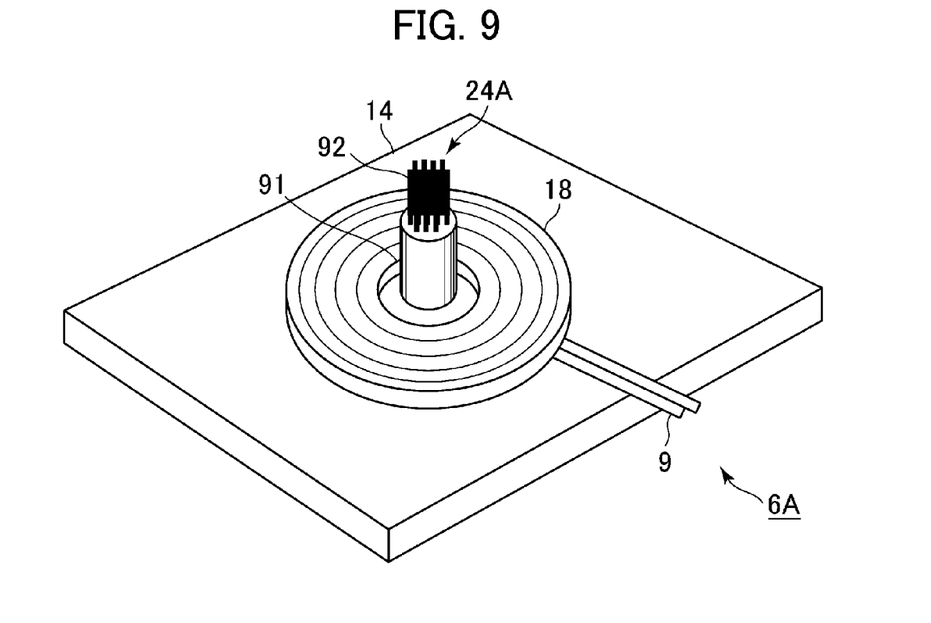
FIG. 9 is a perspective view of a convex portion of a receiver unit in a wireless charging system according to a first modified change of the first embodiment of the present invention when viewed from a transmitter unit side.
Figure 10:
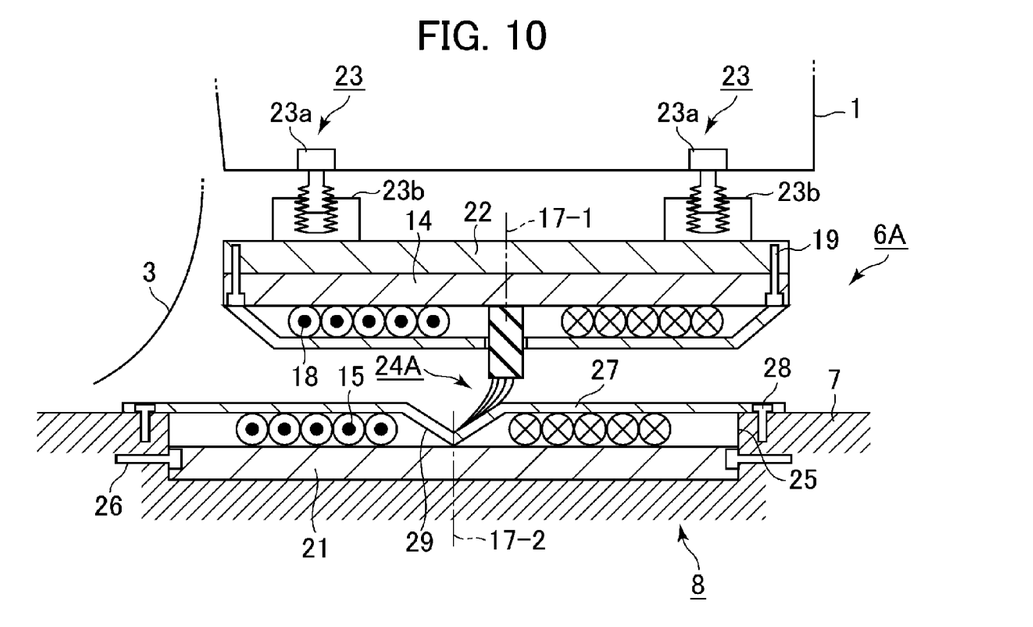
FIG. 10 is an enlarged view of a circumference of the receiver unit and the transmitter unit shown in FIG. 9.

FIG. 9 is a perspective view of a convex portion 24A of a receiver unit 6A in a wireless charging system according to a first modified change of the first embodiment of the present invention when viewed from the transmitter unit 8 side. FIG. 10 is an enlarged view of the circumference of the receiver unit 6A and the transmitter unit 8 shown in FIG. 9. The convex portion 24A shown in FIGS. 9 and 10 includes a large diameter portion 91 made of a columnar magnetic rubber and mounted to the magnetic member 14, and a small diameter portion 92 made of plural linear magnetic rubbers standing together in large number on the tip of the large diameter portion 91. Each of diameters of the magnetic rubbers composing the small diameter portion 92 is smaller than that of the large diameter portion 91. Even when the convex portion 24A is structured in the manner as described above, as shown in FIG. 10, the small diameter portion 92 located at the tip of the convex portion 24A as shown in FIG. 10 can be deformed so as to follow a tapered surface (inclined surface) of the convex portion 29. Thus, the same effects as those in the first embodiment can be obtained. It is noted that a piano wire or the like may be utilized as the linear object of the small diameter portion 92.

Figure 11:
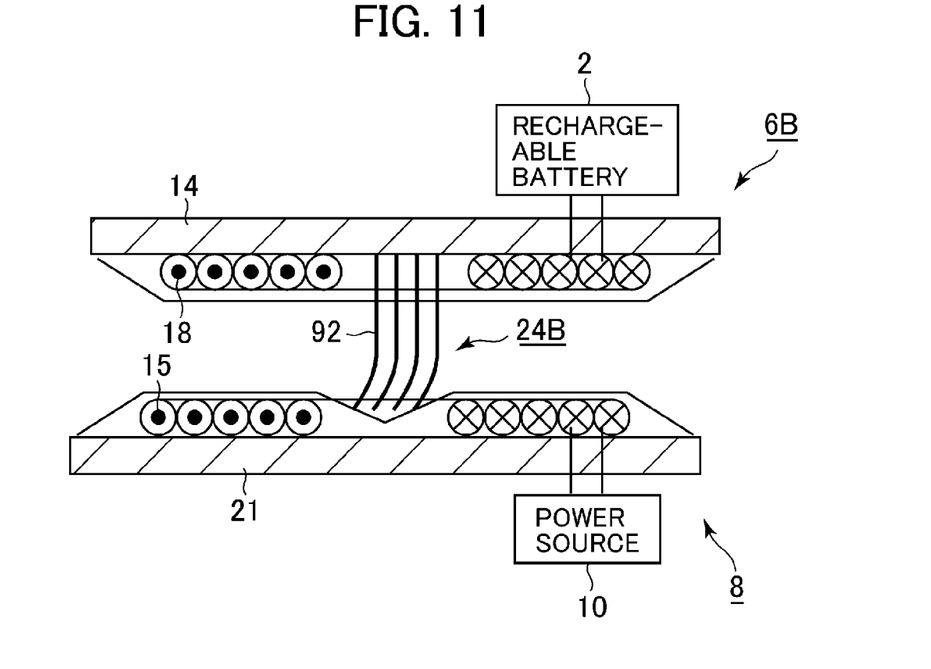
FIG. 11 is a schematic view of a convex portion of a receiver unit in a wireless charging system according to a second modified change of the first embodiment of the present invention.

FIG. 11 is a schematic view of a convex portion 24B of a receiver unit 6B in a wireless charging system according to a second modified change of the first embodiment of the present invention. The convex portion 24B shown in FIG. 11 is composed of only the small diameter portion 92 shown in FIGS. 9 and 10, and is made of plural linear magnetic rubbers standing together in large numbers on the magnetic member 14. Even when the convex portion 24B is structured in the manner as described above, the tips of the convex portion 24B can be deformed so as to follow the tapered surface of the concave portion 29. Thus, the same effects as those in the first embodiment can be obtained.

Figure 12:
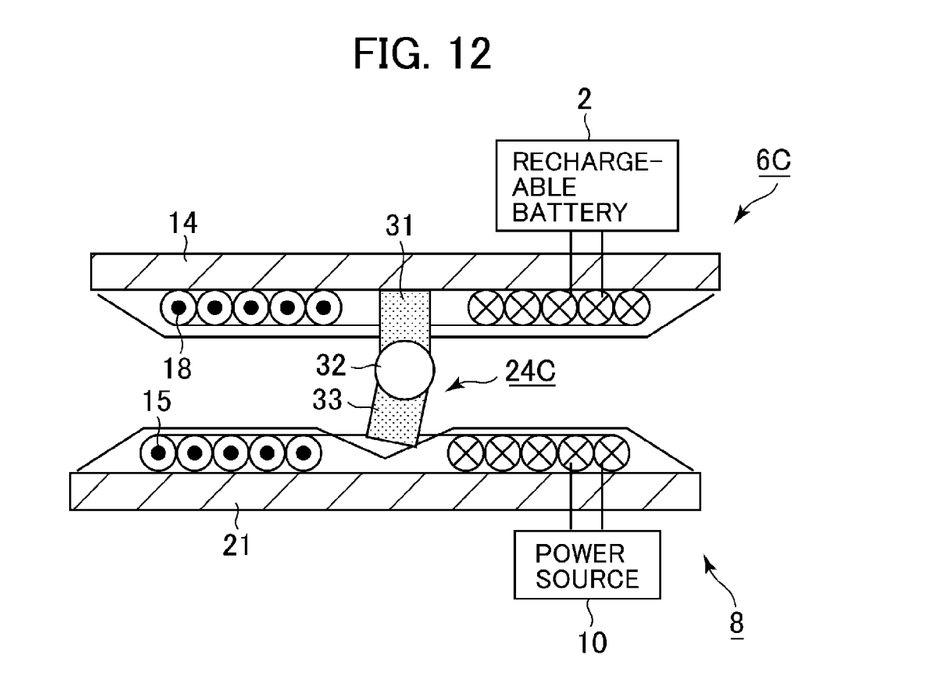
FIG. 12 is a schematic view of a convex portion of a receiver unit in a wireless charging system according to a third modified change of the first embodiment of the present invention.

FIG. 12 is a schematic view of a convex portion 24C of a receiver unit 6C in a wireless charging system according to a third modified change of the first embodiment of the present invention. The convex portion 24C shown in FIG. 12 includes an approximately columnar base portion 31 mounted to the magnetic member 14, a mediate portion 32 provided at the tip of the base portion 31, and an approximately cylindrical tip portion 33 mounted to the mediate portion 32. The tip portion 33 and the base portion 31 are mutually rotatably held through the mediate portion 32. Although each of the tip portion 33 and the base portion 31 contains therein a magnetic material, the tip portion 33 and the base portion 31 may be made of different materials, respectively, as other materials except for the magnetic material. It is noted that a material having a Young's modulus which is smaller than that of the base portion 31 is preferably selected as other material of the tip portion 33. Even when the convex portion 24C is formed in such a manner, the tip portion 33 is pivoted through the mediate portion 32. Therefore, since the tip of the convex portion 24C can be deformed so as to follow the tapered surface of the concave portion 29, it is possible to obtain the same effects as those in the first embodiment.

Figure 13:
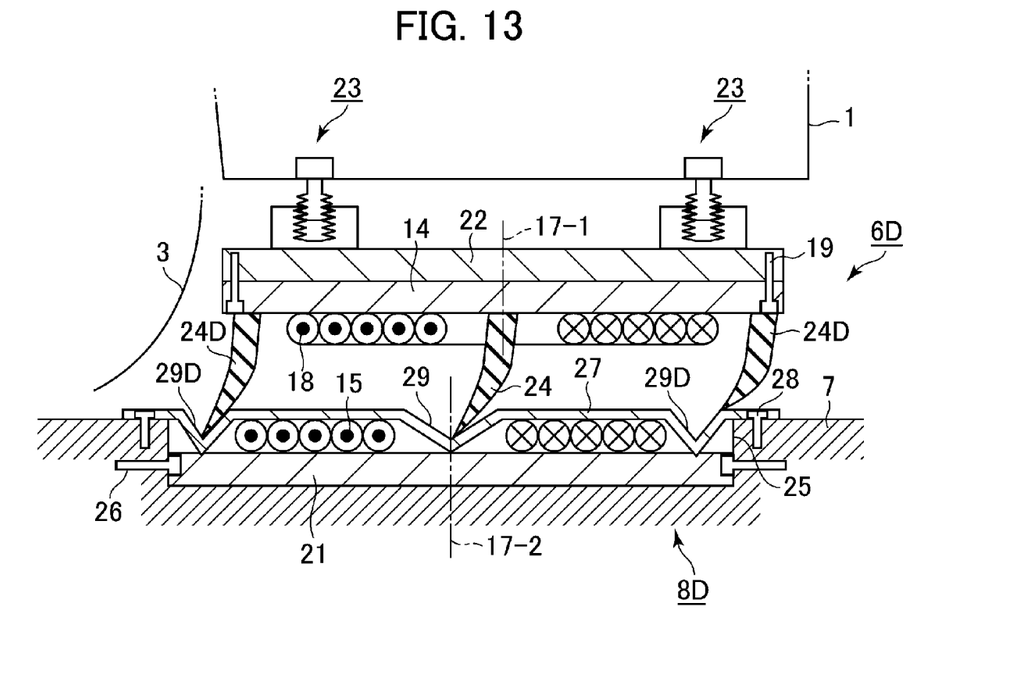
FIG. 13 is an enlarged view of a circumstance of a receiver unit and a transmitter unit in a wireless charging system according to a second embodiment of the present invention.
Figure 14:
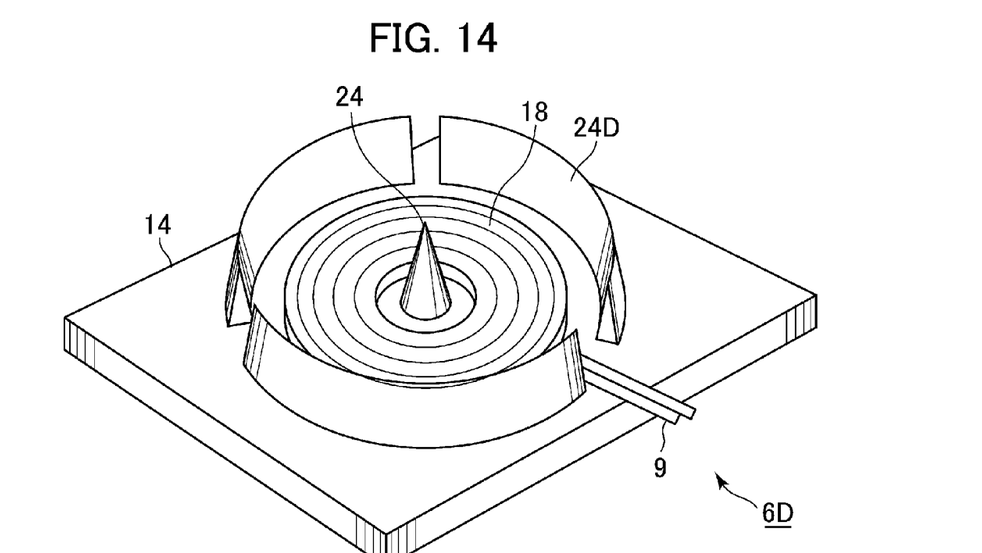
FIG. 14 is a perspective view showing the receiver unit in the wireless charging system according to the second embodiment of the present invention when viewed from the transmitter unit side.

FIG. 13 is an enlarged view of a circumference of a receiver unit 6D and a transmitter unit 8D in a wireless charging system according to a second embodiment of the present invention (during charging). FIG. 14 is a perspective view of the receiver unit 6D in the wireless charging system according to the second embodiment of the present invention when viewed from the transmitter unit 8D side.

As shown in FIGS. 13 and 14, the receiver unit 6D also includes an approximately annular convex portion 24D in addition to the convex portion 24 in the first embodiment. The convex portion 24D is disposed in the outer periphery of the coil portion 18 and is formed by dividing a columnar surface having a larger inner diameter than an outer diameter of the coil portion 18. In the second embodiment of the present invention, the columnar surface with the central axis 17-1 as a center is divided into three parts to obtain the convex portion 24D. A thickness of the convex portion 24D is preferably made small as it further gets away from the magnetic member 14 similarly to the case of the diameter of the convex portion 24. The convex portion 24D contains therein as a material thereof a magnetic material similarly to the case of the convex portion 24, and a magnetic rubber, for example, is preferable as the material of the convex portion 24D.

As shown in FIG. 13, the transmitter unit 8D further includes a cover 27D which is provided with an approximately annular concave portion 29D in addition to the concave portion 29 in the first embodiment. The cover 27D is a depression which is provided in the cover 27D so as to face the convex portion 24D when the two coil portions 15 and 18 are coaxially disposed, and is provided in a circular shape in the outer periphery of the coil portion 15 in the second embodiment. Similarly to the case of the concave portion 29, a size (a difference between an inner diameter and an outer diameter) of the concave portion 29D in the radial direction of the coil portion 15 is preferably formed so as to become large as it further gets away from the magnetic member 21. The concave portion 29D shown in the figure has a V letter-like shape in cross section. It is noted that the concave portion 29D may be made as an arc-like set which is obtained by dividing a circle into three parts so as to correspond to the shape of the concave portion 24D.

In the wireless charging system according to the second embodiment of the present invention which is structured in such a manner, when the work for charging the secondary battery 2 with the electricity is intended to be carried out, similarly to the case of the previously stated first embodiment, the receiver unit 6D is descended to the transmitter unit 8D side by the lifting mechanism 23. In this case, even in the case where the central axes 17-2 and 17-1 of the two coil portions 15 and 18 are slightly misaligned with each other, if the tips of the convex portion 24 and the convex portion 24D which are disposed in the receiver unit 6D are guided into the concave portion 29 or the concave portion 29D of the transmitter unit 8D, then, the magnetic path is formed by both of the convex portion 24 and the convex portion 24D. Referring to FIG. 13, the tip of the concave portion 24D is moved along an inclined surface of the concave portion 29D of the transmitter unit 8, whereby the convex portion 24D is deformed to form the magnetic path through which the outer periphery of the reception side coil portion 18, and the outer periphery of the transmission side coil portion 15 are connected to each other. As a result, even when the imperfect alignment is caused between the transmitter unit 8D and the receiver unit 6D, the magnetic fluxes pass through the convex portion 24 and the convex portion 24D each having the low-magnetic resistance. For this reason, it is possible to increase the coupling coefficient between the transmitter unit 8D and the receiver unit 6D.

Therefore, according to the second embodiment of the present invention, even when the imperfect alignment is caused between the transmitter unit 8D and the receiver unit 6D, the magnetic path through which the transmitter unit 8D and the receiver unit 6D are coupled to each other is formed by both of the convex portion 24 and the convex portion 24D. Thus, the reduction of the electric power feeding efficiency can be suppressed. In particular, in the second embodiment of the present invention, the magnetic field lines which cannot interlink in the first embodiment can interlink the receiver unit 18 by the magnetic path generated by the convex portion 24D. Therefore, it is possible to further suppress the reduction of the electric power feeding efficiency.

Figure 15:
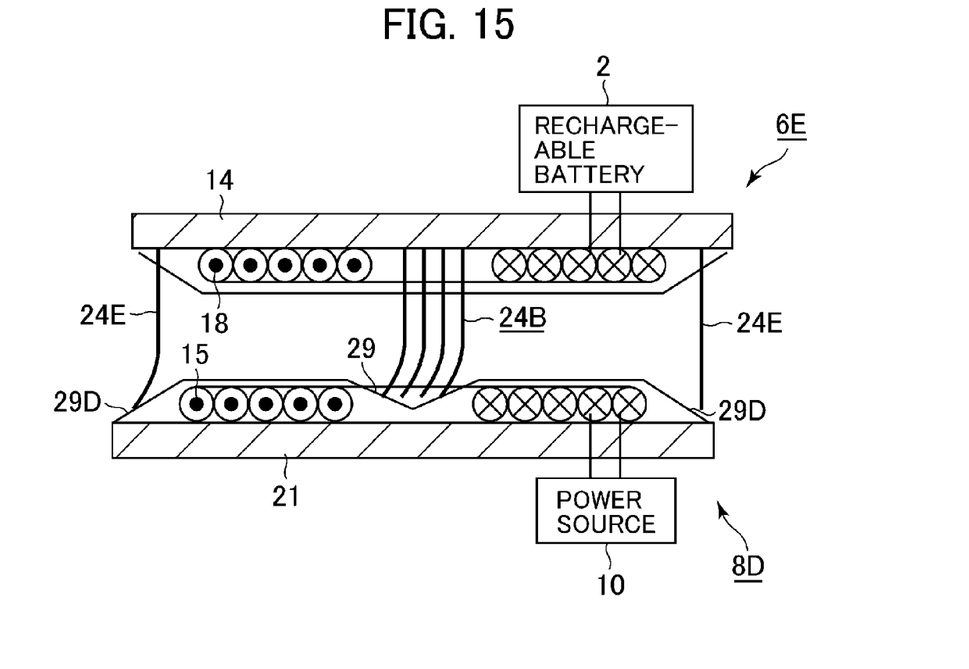
FIG. 15 is a schematic view of a receiver unit and a convex portion in a wireless charging system according to a modified change of the second embodiment of the present invention.

It is noted that although from a viewpoint of readily guiding the convex portion 24D to the tapered surface of the concave portion 29D, the thickness of the convex portion 24D is preferably decreased as it further gets away from the magnetic member 14, the thickness of the convex portion 24D may be set as a given thickness. In addition, with regard to other structures of the convex portion 24D, as shown in FIGS. 9 and 10, plural linear magnetic rubbers which stand together in large numbers may be mounted to the tip portion, as shown in FIG. 11, the convex portion 24D may be composed of only plural linear magnetic rubbers which stand together in large numbers, or as shown in FIG. 12, the convex portion 24D may include the mediate portion 32. FIG. 15 is a schematic view of a convex portion 24E of the receiver unit 6E in a wireless charging system according to a modified change according to the second embodiment of the present invention. As shown in the figure, each of the convex portion 24B, and the convex portion 24E located in the outer periphery of the convex portion 24B may be composed of the linear magnetic rubber.

In addition, although in the foregoing, the description has been given with respect to the case where the convex portion 24, and the convex portion 24D in the outer periphery of the convex portion 24 are provided, even in the case where the convex portion 24 is omitted and only the convex portion 24D is provided, it is possible to suppress the reduction of the electric power feeding efficiency.

In addition, the convex portion 24 and the convex portion 24D need not be entirely made of the same material. If only each of tip portions of the convex portion 24 and the convex portion 24D is made of a mixed member consisting of a resin and a magnetic material, the convex portion 24 and the convex portion 24D can be deformed so as to follow the tapered surfaces of the concave portion 29 and the concave portion 29D, respectively. As a result, the effects of the present invention can be obtained.

Figure 16:
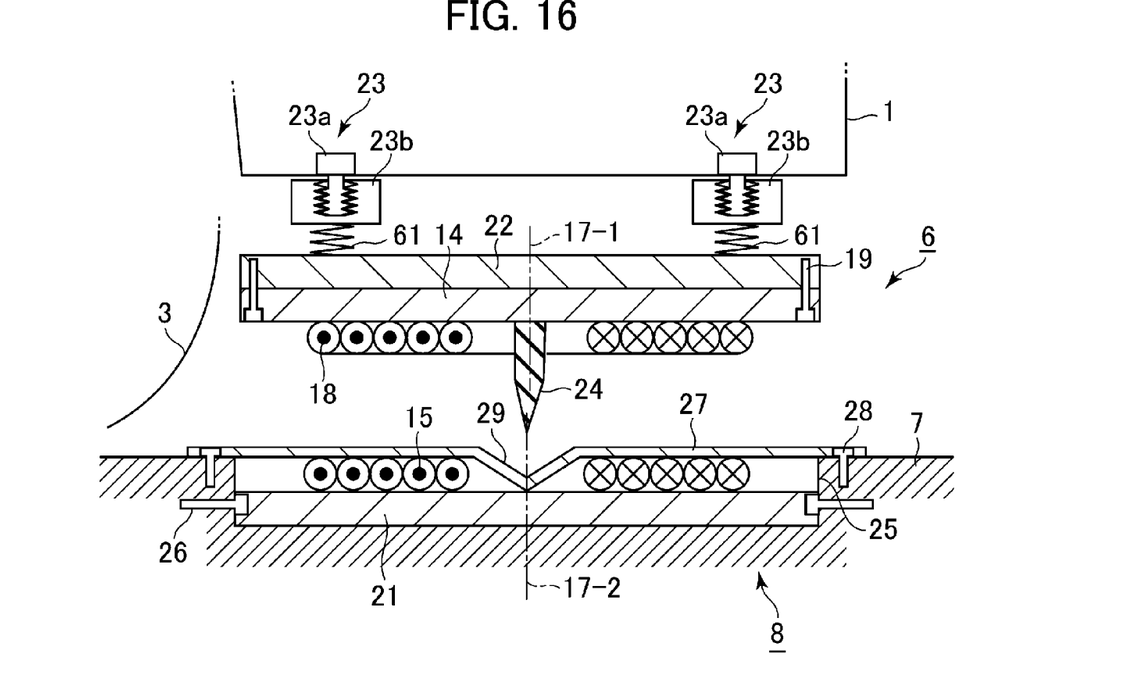
FIG. 16 is an enlarged view of a circumstance of a receiver unit and a transmitter unit in a wireless charging system according to a third embodiment of the present invention.

FIG. 16 is an enlarged view of a circumference of a receiver unit 6 and a transmitter unit 8 in a wireless charging system according to a third embodiment of the present invention (non-charging). Supporting portions 23b shown in the figure support the supporting base 22 through springs 61, respectively. Each of the springs 61 functions as supporting means for swingably supporting the magnetic member 14 in the radial direction of the coil portion 18. If the magnetic member 14 is swingably supported in such a manner, even in the case where the central axes 17-2 and 17-1 of the two coil portions 15 and 18 are slightly misaligned with each other when the receiver unit 6 is descended to the transmitter unit 8 side, if the tip of the convex portion 24 is guided into the concave portion 29, then, the magnetic member 14 is moved approximately in the horizontal direction as the receiver unit 6 is further descended. Therefore, even when the convex portion 24 is not bent, the magnetic path can be formed by the convex portion 24. Therefore, similarly to the cases of the first and second embodiments described above, the reduction of the electric power feeding efficiency can be suppressed. It is noted that from the viewpoint of readily moving the magnetic member 14, a material whose Young's modulus (whose rigidity) is larger than that of the spring 61 is preferably selected as the main material of the convex portion 24 in the third embodiment.

Now, in the embodiments described above, the description has been given by exemplifying the structure in which by giving priority to the viewpoint of not standing in the way of the coming and going of the human beings or the like, the concave portion 29 is provided in the transmitter unit 8 on the ground side, and the convex portion 24 is provided in the receiver unit 6 which is movable in the axial direction, thereby making the receiver unit 6 close to the transmitter unit 8. Contrary to this, there may also be adopted a structure in which the transmitter unit 8 is made close to the receiver unit 6. In addition, there may also be adopted a structure in which the convex portion is provided in the transmitter unit, and the concave portion is provided in the receiver unit.

In addition, the receiver unit 6 shown in FIG. 1 is installed on the bottom surface of the electric moving vehicle 1 so as to face the ground 7 in which the transmitter unit 8 is embedded. However, it is only necessary that the receiver unit 6 shown in FIG. 1 is disposed so as to face the transmitter unit 8. Thus, the receiver unit 6 shown in FIG. 1 may also be installed in any other suitable place so as to correspond to the installation position of the transmitter unit 8. For example, when the transmitter unit 8 is installed on the side surface of the electric moving vehicle 1, it is only necessary that the receiver unit 6 is installed on the side surface of the electric moving vehicle 1 so as to face the transmitter unit 8. Also, when the transmitter unit 8 is installed above the electric moving vehicle 1, it is only necessary that the receiver unit 6 is installed on the upper surface of the electric moving vehicle 1. In addition, although the transmitter unit 8 shown in FIG. 1 is embedded in the ground (road surface) 7, the transmitter unit 8 may also be installed in any other suitable place as long as the transmitter unit 8 is disposed so as to face the receiver unit 6 in the manner as previously stated.

What is claimed is:

1. A wireless charging system comprising a first coil portion fixed to a first magnetic member, and a second coil portion fixed to a second magnetic member, said first coil portion and said second coil portion being made close to each other to be disposed so as to face each other, thereby feeding electric power from one coil portion to the other coil portion, said wireless charging system further comprising:
    a convex portion which is mounted to said first magnetic member so as to protrude toward said second magnetic member when said first coil portion and said second coil portion are coaxially disposed;
    a cover for covering said second coil portion; and
    a concave portion which is provided in the cover so as to face said convex portion when said first coil portion and said second coil portion are coaxially disposed,
    wherein said convex portion contains a magnetic material.

2. The wireless charging system according to claim 1, wherein said convex portion has a length extending in an axial direction of said first coil portion, with the length being greater than a length by which said first coil portion extends in a radial direction.

3. The wireless charging system according to claim 1, wherein said convex portion protrudes from a hollow portion in said first coil portion.

4. The wireless charging system according to claim 1, wherein said convex portion is disposed in an outer periphery of said first coil portion.

5. The wireless charging system according to claim 3, further comprising:
    another convex portion which is mounted to said first magnetic member so as to protrude toward said second magnetic member when said first coil portion and said second coil portion are coaxially disposed; and
    another concave portion which is provided in said cover so as to face said another convex portion when said first coil portion and said second coil portion are coaxially disposed,
    wherein said another convex portion contains a magnetic material, and is disposed in an outer periphery of said first coil portion.

6. The wireless charging system according to claim 1, wherein said convex portion gradually decreases in diameter toward said second coil portion along an axial direction of said first coil portion.

7. The wireless charging system according to claim 1, wherein said concave portion gradually increases in diameter toward said first coil portion along an axial direction of said second coil portion.

8. The wireless charging system according to claim 1, further comprising supporting means for swingably supporting said first magnetic member.

* * * * *